(12) United States Patent
Paek et al.

(10) Patent No.: US 9,361,883 B2
(45) Date of Patent: Jun. 7, 2016

(54) DICTATION WITH INCREMENTAL RECOGNITION OF SPEECH

(75) Inventors: Timothy S. Paek, Sammamish, WA (US); Bongshin Lee, Issaquah, WA (US); Bo-June Hsu, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 926 days.

(21) Appl. No.: 13/460,854

(22) Filed: May 1, 2012

(65) Prior Publication Data

US 2013/0297307 A1 Nov. 7, 2013

(51) Int. Cl.
*G10L 15/22* (2006.01)
*G10L 15/26* (2006.01)

(52) U.S. Cl.
CPC ............ *G10L 15/22* (2013.01); *G10L 15/26* (2013.01); *G10L 2015/221* (2013.01)

(58) Field of Classification Search
CPC ....................................................... G10L 15/22
USPC .................................. 704/251, 253, 256, 270
See application file for complete search history.

(56) References Cited

U.S. PATENT DOCUMENTS

| | | | | |
|---|---|---|---|---|
| 5,231,670 A * | 7/1993 | Goldhor | ............... | G06F 3/16 |
| | | | | 704/275 |
| 5,526,259 A * | 6/1996 | Kaji | ............... | G06F 3/16 |
| | | | | 704/254 |
| 5,818,437 A | 10/1998 | Grover et al. | | |
| 5,855,000 A * | 12/1998 | Waibel et al. | ............... | 704/235 |
| 5,864,805 A * | 1/1999 | Chen et al. | ............... | 704/235 |
| 6,006,183 A * | 12/1999 | Lai | ............... | G10L 15/22 |
| | | | | 704/235 |
| 6,581,033 B1 * | 6/2003 | Reynar et al. | ............... | 704/231 |
| 6,694,296 B1 | 2/2004 | Alleva et al. | | |
| 6,853,971 B2 | 2/2005 | Taylor | | |
| 7,236,931 B2 | 6/2007 | He et al. | | |
| 7,315,818 B2 * | 1/2008 | Stevens et al. | ............... | 704/235 |
| 7,369,997 B2 | 5/2008 | Chambers et al. | | |
| 7,444,286 B2 * | 10/2008 | Roth et al. | ............... | 704/270 |
| 7,480,613 B2 * | 1/2009 | Kellner | ............... | G10L 15/22 |
| | | | | 704/211 |
| 7,805,299 B2 | 9/2010 | Coifman | | |
| 7,925,505 B2 | 4/2011 | Wu | | |
| 8,275,618 B2 * | 9/2012 | Ganong, III | ............... | 704/251 |

(Continued)

OTHER PUBLICATIONS

Wachsmuth et al. "Integratoin of parsing and incremental speech recognition", Proc. of the European Signal Processing Conference, Rhodes, 1998.*

(Continued)

*Primary Examiner* — Jialong He
(74) *Attorney, Agent, or Firm* — Steve Wight; Sandy Swain; Micky Minhas

(57) ABSTRACT

A dictation module is described herein which receives and interprets a complete utterance of the user in incremental fashion, that is, one incremental portion at a time. The dictation module also provides rendered text in incremental fashion. The rendered text corresponds to the dictation module's interpretation of each incremental portion. The dictation module also allows the user to modify any part of the rendered text, as it becomes available. In one case, for instance, the dictation module provides a marking menu which includes multiple options by which a user can modify a selected part of the rendered text. The dictation module also uses the rendered text (as modified or unmodified by the user using the marking menu) to adjust one or more models used by the dictation model to interpret the user's utterance.

20 Claims, 9 Drawing Sheets

(56) References Cited

U.S. PATENT DOCUMENTS

| | | | |
|---|---|---|---|
| 2001/0014854 A1* | 8/2001 | Stegmann et al. | 704/211 |
| 2008/0255844 A1 | 10/2008 | Wu | |
| 2010/0088097 A1 | 4/2010 | Tian et al. | |
| 2010/0169098 A1 | 7/2010 | Patch | |
| 2010/0228548 A1 | 9/2010 | Liu et al. | |
| 2010/0250243 A1 | 9/2010 | Schalk et al. | |
| 2011/0087491 A1 | 4/2011 | Wittenstein et al. | |
| 2011/0257973 A1* | 10/2011 | Chutorash et al. | 704/235 |

OTHER PUBLICATIONS

Baumann et al. "Assessing and Improving the Performance of Speech Recognition for Incremental Systems", Proceedings of Human Language Technologies, 2009.*

Vimala, et al., "A Review on Speech Recognition Challenges and Approaches," retrieved at <<http://www.wcsit.org/pub/2012/vol.2.no.1/A%20Review%20on%20Speech%20Recognition%20Challenges%20and%20Approaches.pdf>>, World of Computer Science and Information Technology Journal, vol. 2, No. 1, Jan. 2012, pp. 1-7.

Aist, et al., "Incremental understanding in human-computer dialogue and experimental evidence for advantages over non-incremental methods," retrieved at <<http://www.cs.rochester.edu/research/cisd/pubs/2007/aist-et-al-decalog-2007.pdf>>, Proceedings of the 11th Workshop on the Semantics and Pragmatics of Dialogue, 2007, pp. 149-154.

Altmann, et al., "Incremental interpretation at verbs: restricting the domain of subsequent reference," retrieved at <<http://homepage.mac.com/gerry_altmann/research/papers/files/Altmann_Kamide_99.pdf>>, Cognition, vol. 72, No. 3, 1999, pp. 247-264.

Basapur, et al., "User Expectations from Dictation on Mobile Devices," retrieved at <<http://condor.depaul.edu/sxu/Publications/C2_UserExpectationsFromDictationOnMobileDevices.pdf>>, Human-Computer Interaction, Part II, LNCS, vol. 4551, Springer-Verlag Berlin Heidelberg, 2007, 9 pages.

Baumann, et al., "Assessing and Improving the Performance of Speech Recognition for Incremental Systems," retrieved at <<http://www.aclweb.org/anthology-new/N/N09/N09-1043.pdf>>, Proceedings of Annual Conference of the North American Chapter of the ACL, 2009, pp. 380-388.

Bellegarda, Jerome R. "Statistical language model adaptation: review and perspectives," retrieved at <<http://citeseerx.ist.psu.edu/viewdoc/download?doi=10.1.1.91.4893&rep=rep1&type=pdf>>, Speech Communication, vol. 42, 2004, pp. 93-108.

Clark, et al., "Grounding in Communication," retrieved at <<http://itu.dk/people/rkva/2011-Spring-EB22/readings/Grounding-in-Communication.pdf>>, Perspectives on Socially Shared Cognition, American Psychological Association, Washington, DC, 1991, pp. 127-149.

Fink, et al., "Incremental Speech Recognition for Multimodal Interfaces," retrieved at <<http://ieeexplore.ieee.org/stamp/stamp.jsp?tp=&arnumber=724027>>, Proceedings of IECON, 1998, pp. 2012-2017.

Gales, M.J.F., "Maximum Likelihood Linear Transformations for HMM-Based Speech Recognition," retrieved at <<http://citeseerx.ist.psu.edu/viewdoc/download?doi=10.1.1.21.444&rep=rep1&type=pdf>>, Computer Speech and Language, vol. 12, No. 2, 1998, 19 pages.

Gunawardana, et al., "Usability Guided Key-target Resizing for Soft Keyboards," retrieved at <<http://research.microsoft.com/pubs/118375/paper-final.pdf>>, Proceedings of the 15th International Conference on Intelligent User Interfaces, 2010, pp. 111-118.

Hart, Sandra G., "Nasa-Task Load Index (Nasa-TLX); 20 Years Later," retrieved at <<http://humansystems.arc.nasa.gov/groups/TLX/downloads/HFES_2006_Paper.pdf>>, Proceedings of the Human Factors and Ergonomics Society Annual Meeting, 2006, pp. 904-908.

Hoggan, et al., "Investigating the Effectiveness of Tactile Feedback for Mobile Touchscreens," retrieved at <<http://www.dcs.gla.ac.uk/~eve/papers/CHI2008_eve.pdf>>, Proceedings of the Twenty-sixth Annual SIGCHI Conference on Human Factors in Computing Systems, 2008, 10 pages.

Karat, et al., "Patterns of Entry and Correction in Large Vocabulary Continuous Speech Recognition Systems," retrieved at <<http://citeseerx.ist.psu.edu/viewdoc/download?doi=10.1.1.115.8458&rep=rep1&type=pdf>>, Proceedings of the SIGCHI Conference on Human Factors in Computing Systems, 1999, pp. 568-575.

Kurtenbach, Gordon, "User Learning and Performance with Marking Menus," retrieved at <<http://autodeskresearch.com/pdf/94-p258-kurtenbach-learning.pdf>>, Proceedings of the SIGCHI Conference on Human Factors in Computing Systems, 1994, pp. 258-264.

Lee, et al., "MAP Estimation of Continuous Density HMM: Theory and Applications," retrieved at <<http://citeseerx.ist.psu.edu/viewdoc/download?doi=10.1.1.56.4092&rep=rep1&type=pdf>>, Proceedings of DARPA Speech & Nat. Lang.Workshop, 1992, 6 pages.

Levenshtein, V.I., "Binary Codes Capable of Correcting Deletions, Insertions, and Reversals," retrieved at <<http://www.freearchive.org/o/964e741877a3ffa8f2195ee253597fbaeed69a207e77df150439802fd370b2f8>>, Soviet Physics Doklady, 1966, pp. 707-710.

Mackenzie, et al., "Text Entry for Mobile Computing: Models and Methods, Theory and Practice," retrieved at <<http://web.cs.wpi.edu/~gogo/courses/cs525H_2010f/papers/MacKenzie_Soukoreff_TextEntry_2002.pdf>>, Human-Computer Interaction, vol. 17, 2002, Lawrence Erlbaum Associates, Inc., 2002, pp. 147-198.

"Mobile Speech Recognition | Voice Recognition | Windows Phone 7," retrieved at <<http://www.microsoft.com/windowsphone/en-us/howto/wp7/basics/use-speech-on-my-phone.aspx>>, Microsoft Corporation, Redmond, WA, retrieved in Jan.-Feb. 2012, 8 pages.

"Nuance—Dragon Dictation: iPhone—Dragon Dictation for iPadTM, iPhoneTM and iPod touchTM is an easy-to-use voice recognition application," retrieved at <<http://www.nuance.com/for-business/by-product/dragon-dictation-iphone/index.htm>>, Nuance Communication, Inc., Burlington, MA, retrieved on Feb. 6, 2012, 1 page.

Rabiner, et al., "Fundamentals of Speech Recognition," retrieved at <<http://205.196.121.89/4z43avtpg4xg/wvijzimqnbl/Fundamentals+of+Speech+Recognition.pdf>>, Prentice-Hall, Inc., Englewood Cliffs, NJ, 1993, 277 pages.

Rabiner, Lawrence R., "A Tutorial on Hidden Markov Models and Selected Applications in Speech Recognition," retrieved at <<http://www.cs.ubc.ca/~murphyk/Bayes/rabiner.pdf>>, Proceedings of IEEE, vol. 77, No. 2, 1989, pp. 257-286.

Selfridge, et al., "Stability and Accuracy in Incremental Speech Recognition," retrieved at <<http://www2.research.att.com/~jdw/papers/selfridge2011sigdial.pdf>>, Proceedings of SIGDIAL, 2011, 10 pages.

Skantze, et al., "Incremental Dialogue Processing in a Micro-domain," retrieved at <<http://www.aclweb.org/anthology/E/E09/E09-1085.pdf>>, Proceedings of the 12th Conference of the European Chapter of the ACL, 2009, pp. 745-753.

Steele, et al., "The Android Developer's Cookbook: Building Applications With the Android SDK," retrieved at >>http://205.196.122.66/ev0y3k46v6zg/no9q4b6i5io23go/Addison-Wesley+The+Android+Developer%5C%27s+Cookbook%2C+Building+Applications+with+the+Android+SDK+%282011%29.pdf>>, Addison-Wesley, first printing Oct. 2010, 355 pages.

Suhm, et al., "Multi-Modal Error Correction for Speech User Interfaces," retrieved at <<http://www.cparity.com/projects/AcmClassification/samples/371166.pdf>>, ACM Transactions on Computer-Human Interaction, vol. 8, No. 1, Mar. 2001, pp. 60-98.

"Swype | Type Fast, Swype Faster," retrieved at <<http://www.swype.com>>, Swype, Inc., Seattle, WA, retrieved on Feb. 6, 2012, 1 page.

Tanenhaus, et al., "Integration of Visual and Linguistic Information in Spoken Language Comprehension," retrieved at >>http://www.ircs.upenn.edu/igert/LSA363/readings/7-5-Tanenhaus.pdf>>,Science, vol. 268, No. 5217, 1995, pp. 1632-1634.

(56) References Cited

OTHER PUBLICATIONS

Traxler, et al., "Influence of Connectives on Language Comprehension: Eye-tracking Evidence for Incremental Interpretation," retrieved at <<http://www.let.uu.nl/~ted.sanders/personal/uploads/pdf/Traxler_Bybee_Pickering_1997.pdf>>, The Quarterly Journal of Experimental Psychology, Section 50A, 3, 1997, pp. 481-497.

"Voice to Text Application Powered by Intelligent Voice Recognition | Vlingo," retrieved at <<http://www.vlingo.com>>, Vlingo, Cambridge, MA, retrieved on Feb. 6, 2012, 2 pages.

Zhai, et al., "Shorthand Writing on Stylus Keyboard," retrieved at <<http://www.almaden.ibm.com/u/zhai/papers/SharkFinal.pdf>>, Proceedings of the SIGCHI Conference on Human Factors in Computing Systems, 2003, 8 pages.

Sherwani, et al., "The Case for Speech Technology for Developing Regions," retrieved at <<http://www.cs.cmu.edu/~jsherwan/pubs/case-slt4d.pdf>>, Proceedings of the Human-Computer Interaction for Community and International Development Workshop, 2008, 8 pages.

Young, Steve, "A Review of Large-vocabulary Continuous-speech Recognition," retrieved at <<http://www-ssli.ee.washington.edu/people/bulyko/papers/Steve_Young.pdf>>, IEEE Signal Processing Magazine, Sep. 1995, pp. 45-57.

Zweig, et al., "Advances in Large Vocabulary Continuous Speech Recognition," retrieved at <<http://research.microsoft.com/en-us/um/people/gzweig/pubs/advances.pdf>>, Signal Processing, vol. 60, 2004, 31 pages.

"Maximum a posteriori estimation," retrieved at <<http://en.wikipedia.org/wiki/Maximum_a_posteriori_estimation>>, Wikipedia online article, retrieved on Feb. 5, 2012, 3 pages.

Kumar, et al., "Voice Typing: A New Speech Interaction Model for Dictation on Touchscreen Devices," retrieved at <<http://www.cs.cmu.edu/~anujk1/CHI2012a.pdf>>, posted on Internet Jan. 2012, 8 pages.

Payne, Stephen J., "Mental Models in Human-Computer Interaction," The Human-Computer Interaction Handbook: Fundamentals, Evolving Technologies and Emerging Applications, Second Edition, CRC Press 2007, pp. 63-76.

Rosen, Larry D., "Speech Recognition Comes of Age," retrieved at <<http://www.csudh.edu/psych/tnp15.html>>, The National Psychologist, Sep./Oct. 1997, 3 pages.

Martin, et al., "Practical Speech Recognizers and Some Performance Effectiveness Parameters," in Trends in Speech Recognition, Wayne A. Lea (Ed.), Prentice-Hall, Inc., Englewood Cliffs, NJ, 1980, pp. 24-37.

\* cited by examiner

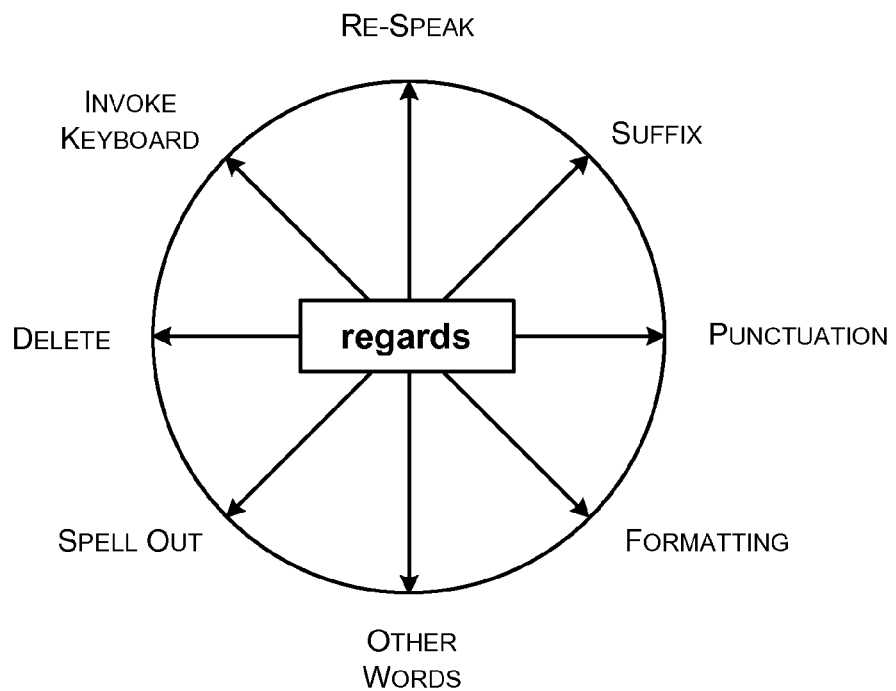
FIG. 4
FIG. 5     FIG. 6

DICTATION WITH INCREMENTAL RECOGNITION OF SPEECH

BACKGROUND

A Large Vocabulary Continuous Speech Recognition (LVCSR) system can perform dictation by converting a user's multi-word utterance into text. In a typical manner of operation, the LVCSR system receives a complete utterance from the user, such as a complete sentence. The LVCSR system then decodes the complete utterance by finding an optimal path through a search space, where the search space defines different possible interpretations of the complete utterance. The LVCSR system then generates and outputs text corresponding to the optimal path. This approach is not wholly satisfactory for reasons set forth herein.

SUMMARY

According to one illustrative implementation, a dictation module is described herein which interprets a user's complete utterance in an incremental portion-by-portion basis, without requiring the user to insert long artificial pauses after each portion. This yields successive instances of recognized speech. The dictation module also provides rendered text associated with each instance of recognized speech as the recognized speech becomes available.

According to another illustrative feature, the dictation module can provide an instance of rendered text in a unit-by-unit serial manner (such as a character-by-character manner), optionally accompanied by sound that simulates the operation of a manual typewriter.

According to another illustrative feature, the dictation module can modify the manner in which it provides an instance of rendered text based on a level of uncertainty associated with the rendered text. For example, the dictation module can slow the rate at which it delivers the rendered text in proportion to the level of uncertainty associated with the rendered text.

According to another illustrative feature, the dictation module can allow the user to modify any part of an instance of the rendered text, after the rendered text has been displayed. For example, the dictation module can display a marking menu that includes a plurality of options. Each option corresponds to a different technique by which the user can modify the rendered text.

According to another illustrative feature, the dictation module can use an acoustic model and a language model to interpret each incremental portion of the complete utterance. The dictation module further includes an adaptation module for updating the acoustic model and/or the language model based on the user's corrective actions (or lack of such actions) with respect to the rendered text.

According to another illustrative feature, the dictation module can adapt a soft key user interface presentation to reflect changes made to the language model.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows another implementation of a marking menu, provided by the dictation module of FIG. 1.

FIGS. 5-7 illustrate different ways in which a user may interact with a marking menu.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative dictation module for interpreting a user's complete utterance in iterative fashion. Section B describes illustrative methods which explain the operation of the dictation module of Section A. Section C describes illustrative computing functionality that can be used to implement any aspect of the features described in Sections A and B.

Figure 12:
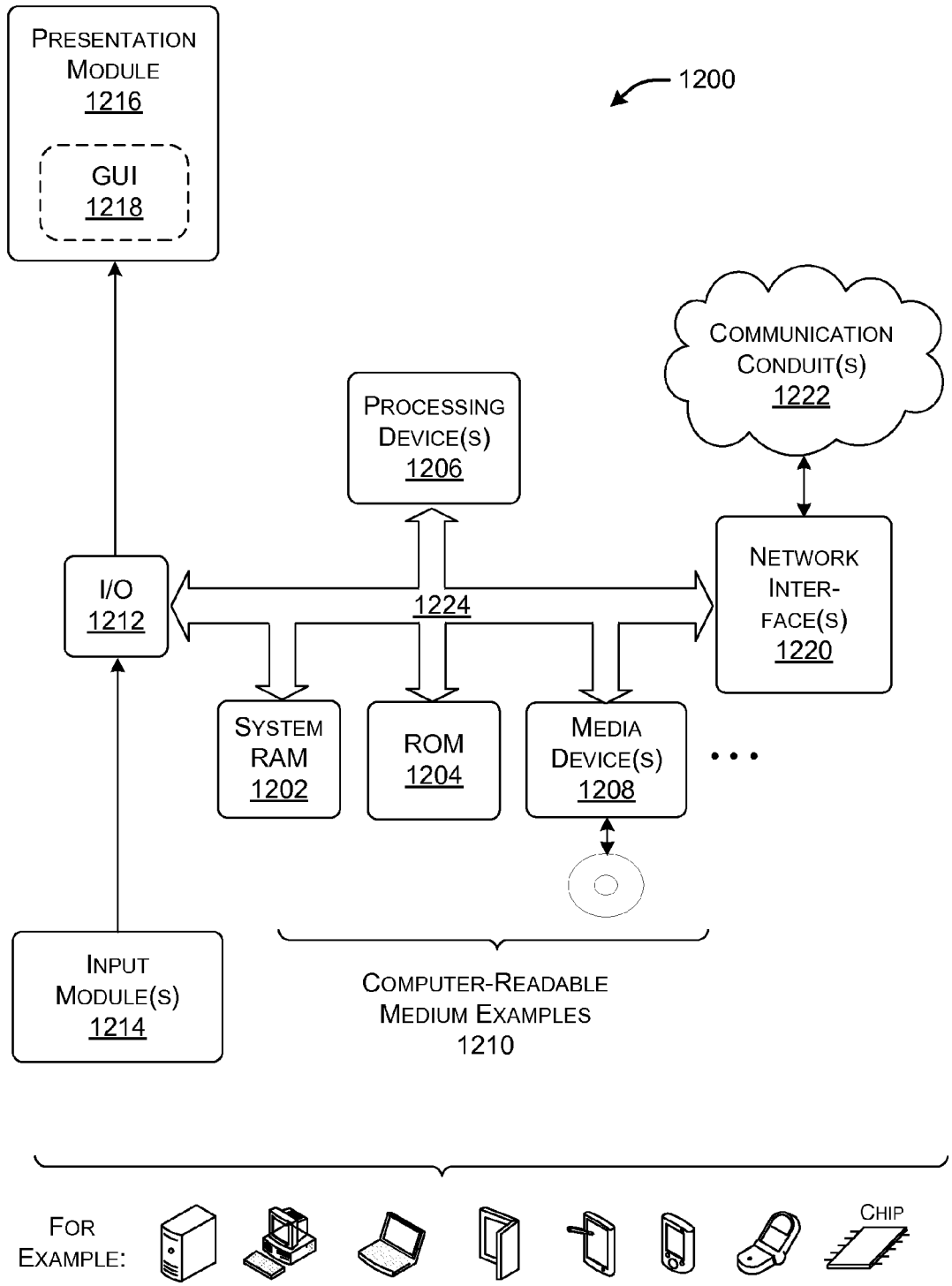
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Dictation Module

Figure 1:
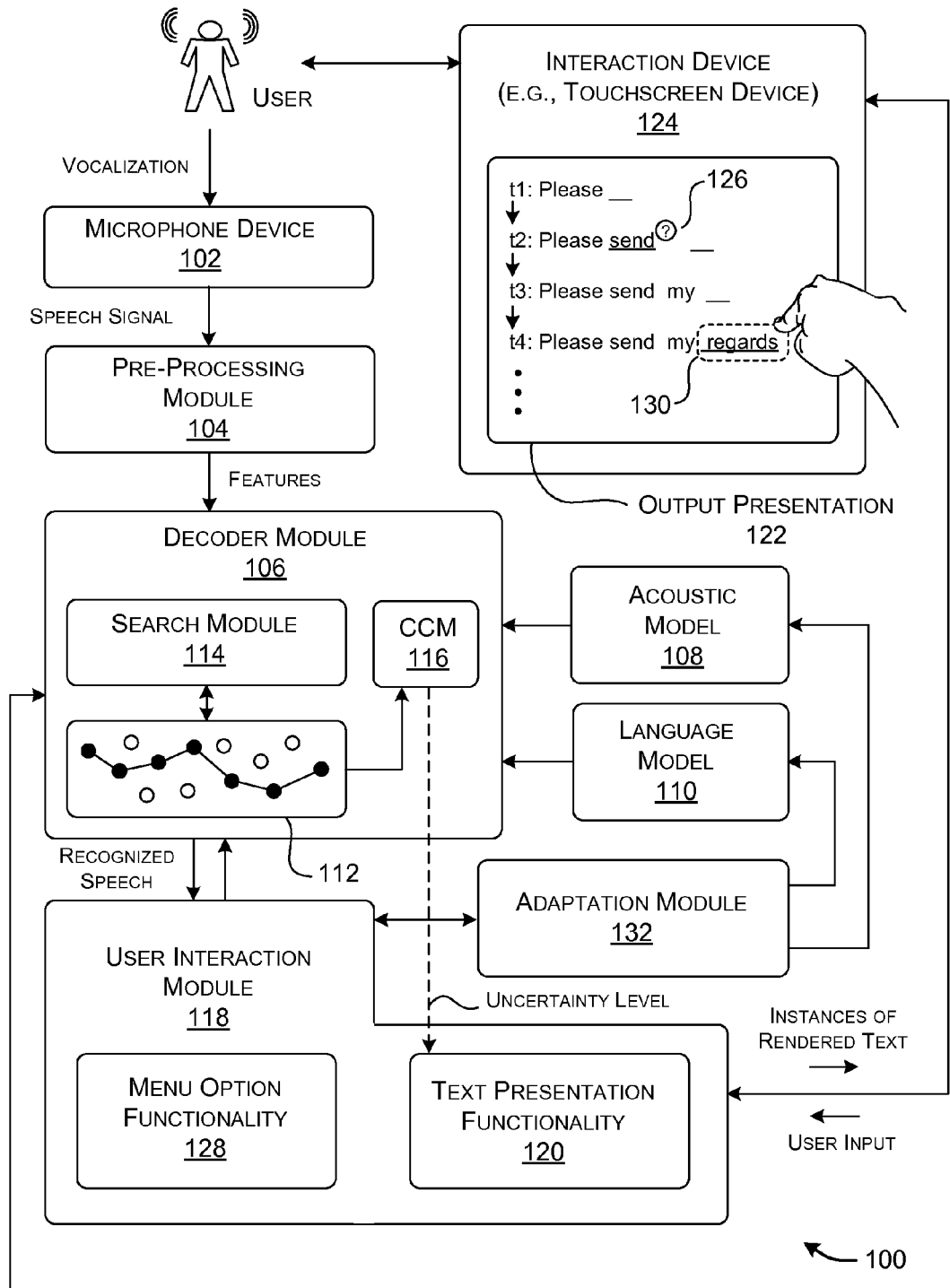
FIG. 1 shows an illustrative dictation module for interpreting a user's utterance in incremental fashion.

FIG. 1 shows an illustrative dictation module 100 for interpreting a user's utterance. The user's utterance may correspond to any unit of speech, such as a sentence fragment, a sentence, multiple sentences, a paragraph, multiple paragraphs, etc. The dictation module 100 interprets the user's utterance in piecemeal fashion, one incremental portion at a time. This operation yields successive instances of recognized speech for the respective incremental portions. An incremental portion may correspond to a word, a phrase, etc. Further, the dictation module 100 presents rendered text for each instance of recognized speech after the recognized speech is produced. Further still, the dictation module 100 allows a user to modify any part of any instance of rendered text as soon as it is produced. Taken together, the dictation module 100 provides an automated dictation service that displays rendered text in real time over the course of the user's utterance, without requiring the user to provide long artificial pauses within the utterance.

The dictation module 100 is composed of (or can be conceptualized as being composed of) a plurality of modules that perform different respective functions. To begin with, a microphone device 102 receives the utterance of the user and produces a speech signal. The speech signal corresponds to a waveform that can be expressed in digital form and/or analog form. Alternatively, the microphone device 102 may correspond to two or more individual microphone devices.

A pre-processing module 104 converts the speech signal into features which characterize the speech signal. Different implementations of the pre-processing module 104 can produce different types of features. In one approach, the pre-processing module 104 produces Mel Frequency Cepstral Coefficient (MFCC) feature vectors. In another approach, the pre-processing module 104 produces Linear Predictive Coding (LPC) feature vectors.

A decoder module 106 interprets the features produced by the pre-processing module 104 to provide an instance of recognized speech for each incremental portion of the user's utterance. In one implementation, the decoder module 106 employs Large Vocabulary Continuous Speech Recognition (LVCSR) functionality to perform this task. In this approach, the decoder module 106 determines the most likely sequence of words (w) that match the incremental portion, based on the following equation:

$$\arg\max_{w} P(w \mid a) = \arg\max_{w} \frac{P(w)P(a \mid w)}{P(a)}. \tag{1}$$

In this expression, P(w|a) represents the probability of the word sequence w based on a received speech signal a, P(w) is the probability of the word sequence occurring independent of the audio sequence a, P(a|w) is the probability of the speech signal a occurring given the word sequence w, and P(a) represents the probability of the speech signal a occurring independent of any word sequence w. Since P(a) remains the same regardless of the word sequence w, this term can be eliminated from the above equation, leaving the P(w) and P(a|w) terms in the numerator.

An acoustic model 108 provides the probability term P(a|w). For example, in one approach, the acoustic model 108 can express the term P(a|w) using Hidden Markov Models (HMMs). Mathematically, the term P(a|w) can be expressed as:

$$P(a \mid w) = \sum_{s} P(a \mid s) P(s \mid w) = \sum_{s} \prod_{t=1\ldots,n} b_{s_t}(o_t) a_{s_t s_{t-1}}. \tag{2}$$

In this expression, s refers to a set of states associated with the vocalization of the speech signal a, P(a|s) refers to the probability of speech signal a given the states s, P(s|w) refers to the probability of the states s given the word sequence w, t refers to time, $b_{s_t}(o_t)$ refers to the probability of producing an acoustic vector o at time t with respect to state $s_t$, and $a_{s_t s_{t-1}}$ refers to the probability of transitioning from state $s_t$ to state $s_{t-1}$. Each observation probability $b_{s_t}(o_t)$, in turn, can be expressed using a mixture of Gaussians in a standard manner.

A language model 110 provides the term P(w). For example, in one approach, the language model 110 can use an n-gram language model to determine P(w), where w corresponds to a sequence of words, $w_1^n = w_1, \ldots w_n$. Mathematically, the probability of a word sequence $w_1^n$ occurring can be approximated by:

$$P(w_1^n) = \prod_{k=1}^{n} P(w_k \mid w_{k-N+1}^{k-1}). \tag{3}$$

The decoder module 106 may leverage Equation (1) in conjunction with a linguistic lattice 112 to find an optimal interpretation of an incremental portion of speech. The linguistic lattice 112 is a graph that describes possible connections between linguistic units, such as phonemes or words, etc. As such, the linguistic lattice 112 defines a search space of possible interpretations of the incremental portion. That is, a particular path through the linguistic lattice 112 defines a particular series of linguistic units, corresponding to one possible interpretation of the incremental portion of the utterance. Another path corresponds to a different possible interpretation of the incremental portion. The overall probability (i.e., likelihood) associated with any path is defined by Equation (1) specified above. This probability, in turn, depends on acoustic-related cost information supplied by the acoustic model 108 and linguistic-related cost information provided by the language model 110.

More specifically, the decoder module 106 may use a search module 114 to find the n best paths through the linguistic lattice 112. These are the paths having the highest probabilities within the search space defined by the linguistic lattice 112. The search module 114 can use any technique to identify these paths, such as the Viterbi algorithm, a dynamic programming algorithm, and so on. The search module 114 can then designate the path having the highest overall probability as the best possible interpretation of the incremental portion. The decoder module 106 can also retain information regarding other paths within the set of n possible paths. As will be described below, the decoder module 106 can present these alternative interpretations to the user, giving the user the option of selecting one of these alternative interpretations (rather the highest-ranked interpretation).

The decoder module 106 can implement the above-described processes in different ways. Without limitation, in one approach, the decoder module 106 can form the linguistic lattice 112 in a dynamic manner as the user speaks an utterance. For example, the decoder module 106 can map the features provided by the pre-processing module 104 to sub-word sound units, such as phonemes. The decoder module 106 can then map the sound units into likely words. The decoder module 106 uses the cost information provided by the acoustic model 108 to perform these recognition tasks. The decoder module 106 then adds the recognized words to the linguistic lattice 112. The linguistic lattice 112 connects the words together to define possible interpretations of the user's utterance. The decoder module 106 also assigns appropriate cost information to the links (arcs) in the linguistic lattice 112, as provided by the acoustic model 108 and the language model 110. As described above, the search module 114 can then use an appropriate search technique (such as the Viterbi algorithm) to interpret the user's utterance using the linguistic lattice 112.

A certainty-calculating module (CCM) 116 can assess the level of certainty associated with each viable interpretation, corresponding to a respective path through the linguistic lattice 112. In one implementation, the certainty-calculating module 116 can be implemented as a classifier. The classifier receives a number of input features, such as cost information associated with different paths through the linguistic lattice 112, a number of viable paths through the linguistic lattice 112, acoustic information associated with the user's utterance (in additional to acoustic-related cost information within the linguistic lattice 112 itself), and so on. The classifier maps these input features to output information which indicates the level of certainty associated with different paths in the linguistic lattice 112. The classifier can be trained in a standard manner based on a training corpus which maps features to established certainty levels.

In a traditional approach, a decoder module may wait until the user has made a complete utterance before it invokes its search module to find an optimal path through its linguistic lattice. For example, assume that the user's complete utterance corresponds to the sentence, "Please send my regards to Dr. John Smith of the Maple Street clinic in East Syracuse, who kindly forwarded the lab results." A traditional decoder module will wait until the user has finished this complete sentence before commencing interpretation of the sentence. The traditional decoder module can determine that the user has finished his or her utterance when the user stops speaking at the end of the sentence. More specifically, the traditional decoder module can determine that the user has finished speaking when the user remains silent for a period of time that exceeds a defined threshold, referred to herein as a silence threshold. For example, the silence threshold may be set to several seconds.

On one hand, the above-described traditional manner of operation is advantageous because the decoder module is given the maximum amount of context to interpret the sentence. That is, when interpreting a particular word in the sentence, the traditional decoder module can examine any word(s) that precede the word in question and/or any word(s) that follow the word in question. But the user may also find this approach distracting and confusing. This is because the user's current focus of attention may be directed to a current part of an overall message that is being communicated, yet the traditional decoder module may be presenting recognition results for an unrelated prior part of the utterance; this may have the negative consequence of disrupting the user's flow of thought.

To address this shortcoming, the dictation module 100 described herein interprets a complete utterance in incremental fashion, e.g., one incremental portion at a time. As noted above, the incremental portion may correspond to an individual word, a short phrase, etc. The dictation module 100 can implement the above-described incremental manner of operation in different ways. In one approach, the decoder module 106 can be configured such that the silence threshold is set to zero. Based on this setting, the decoder module 106 will attempt to interpret each incremental portion of the complete utterance as soon as it is received, rather than waiting for the end of the complete utterance. In other words, this configuration setting will cause the decoder module 106 to treat each incremental portion as if it were a complete utterance, without requiring the user to insert long artificial pauses between incremental portions. As stated, a silence threshold set to zero will achieve this result; but more generally, the dictation module 100 can set to the silence threshold to any suitably low value that will achieve the manner of behavior described above. In this sense, the silence threshold can be said to be set to zero or approximately zero.

A user interaction module 118 provides a mechanism by which a user may interact with the output results of the decoder module 106. More specifically, the user interaction module 118 includes text presentation functionality 120 that provides an output presentation 122 on an interaction device 124, such as a touch-sensitive device of a computing device. The output presentation 122 displays rendered text for each instance of recognized speech that is produced by the decoder module 106. That is, the text presentation functionality 120 may work in lockstep with the decoder module 106; as the decoder module 106 produces an instance of recognized speech for a corresponding incremental portion, the text presentation functionality 120 outputs rendered text for this recognized speech.

In one case, for example, the text presentation functionality 120 outputs rendered text on a word-by-word basis. In this case, when the user vocalizes the word "Please," the dictation module 100 will interpret and display the word "Please" (if it interprets this word correctly). When the user vocalizes the next word "send," the dictation module 100 will interpret and display the word "send," and so on. This process continues until the user finishes his or her complete utterance (e.g., the entire above-referenced sentence, "Please send my regards to Dr. John Smith of the Maple Street clinic in East Syracuse, who kindly forwarded the lab results."). (Note that, to facilitate explanation, FIG. 1 illustrates the evolving state of the output presentation 122 by devoting a separate output snapshot for each time instance (e.g., t1, t2, etc.); but, in practice, the output presentation 122 may include a single instance of rendered text that changes as time passes.)

The text presentation functionality 120 can control the output of text to achieve various supplemental effects. For example, the text presentation functionality 120 can present its output in a unit-by-unit fashion, from left to right, such as character-by-character fashion. Each unit forms a part of a representation of the complete utterance. For the words "Please," for example, the text presentation functionality 120 can display the character "P," followed by the letter "l," followed by the letter "e," and so on. This gives the user the impression that the dictation module 100 is typing out the text in manual fashion. In addition, the textual presentation functionality 120 can produce accompanying sounds that simulate the pressing of keys on a manual keyboard.

In addition, the text presentation functionality 120 can communicate the level of uncertainty (or certainty) associated with each part of the rendered text that it displays, such as each word. The text presentation functionality can perform this operation in different ways. First, recall that the certainty-calculating module 116 produces information which expresses the level of uncertainty (or certainty) associated with each interpretation of an incremental portion of speech (and the rendered text associated with that interpretation). In one approach, the text presentation functionality 120 can modulate the rate at which it delivers the rendered text in unit-by-unit fashion based on the level of uncertainty associated with each part of the rendered text that is displayed. For example, assume that there is a relatively high level of uncertainty associated with a particular word identified by the decoder module 106. The text presentation functionality 120 can type out the characters of this word at a relatively slow rate. The user will associate this halting manner of delivery as akin to a human's hesitation in providing an answer for which he or she is unsure.

Alternatively, or in addition, the text presentation functionality 120 can vary any other characteristic of the rendered text to convey its level of uncertainty. For example, the text presentation functionality 120 can vary the color, size, font, transparency level, position, etc. of the rendered text based on its associated level of uncertainty. Alternatively, or in addition, the text presentation functionality 120 can present a symbol or the like in proximity to rendered text that is assessed as being uncertain, such as the representative symbol "?" 126 next to the word "send," which has been assessed as being uncertain.

The user interaction module 118 also includes menu option functionality 128 that provides various user interface features to the user. These user interface features allow the user to interact with the dictation module 100. For example, the menu option functionality 128 provides a plurality of options that enable the user to modify any instance of rendered text in various respective ways, and/or to invoke other functions. The menu option functionality 128 allows the user to make such modifications in piecemeal fashion as each instance of the rendered text is presented on the output presentation 122, rather than (or in addition to) waiting for the dictation module 100 to interpret the entire utterance.

In one manner of operation, the menu option functionality 128 can detect when the user has selected an instance of rendered text. For example, the user can select a word or phrase using any type of input functionality, including, but not limited to: touch screen entry; pen device entry; keypad entry; mouse device entry; video-detected gesture or gaze entry, and so on. In the case of FIG. 1, for example, the user has touched the last-spoken word "regards" 130. In response to this action, the menu option functionality 128 can invoke a menu which provides a plurality of options. A user can modify the selected part of the rendered text using any one of these options. As will be described below, the menu option functionality 128 can present the options as visible user interface features. Alternatively, or in addition, the menu option functionality 128 can enable the options in an implicit manner, e.g., without displaying associated user interface features.

In other cases, the menu option functionality 128 can automatically invoke the menu options without requiring the user to select a part of the rendered text. For example, the menu option functionality 128 can invoke the menu options with respect to the last word or phrase that has been displayed on the output presentation 122. The user may use the menu options to modify this word or phrase, or select another word or phrase in the rendered text. Alternatively, or in addition, the menu option functionality 128 can present at least some menu options in a fixed or movable menu bar or the like.

The dictation module 100 also includes an adaptation module 132. The adaptation module 132 can provide various algorithms for updating the acoustic model 108 and/or the language model 110 based on the output of the decoder module 106 and/or the user interaction module 118.

More specifically, consider the following scenario. Assume that the user speaks the word "regards" in the above-described representative sentence. The decoder module 106 will interpret this phrase to produce recognized speech, and the user interaction module 118 will present the rendered text "regards" in response to the recognition (if correctly interpreted). The user then has two choices; the user either makes a correction to the displayed word, or leaves it alone. In either case, the user's action (or inaction) with respect to the rendered text is tantamount to establishing a label for the speech signal associated with the word in question. That is, this label associates the speech signal with its confirmed interpretation. In this manner, the operation of the decoder module 106 and the user interaction module 118 generates a dynamic body of training data, where each labeled word constitutes an instance of this training data. The adaptation module 132 uses the training data to update the acoustic model 108 and/or the language model 110.

The adaptation module 132 can use, for instance, any of the Maximum A Posteriori (MAP) adaptation technique, the Vocal Tract Length Normalization (VTLN) technique, the Maximum Likelihood Linear Regression (MLLR) technique, etc. to modify the acoustic model 108. The adaptation module 132 can use, for instance, any of a linear interpolation technique, a log-linear interpolation technique, a Minimum Discrimination Information (MDI) technique, etc. to modify the language model 110.

The adaptation module 132 can also modify one or more features of the user interaction module 118 to reflect changes made to the language model 110. For example, the user interaction module 118 can present an arrangement of soft keys or the like, to be described. The adaptation module 132 can modify any aspect of this set of soft keys based on a current state of the language model 110. The following description (with principal reference to FIG. 9) will provide examples of this type of adaptation.

The dictation module 100 can also modify its decoding operation to facilitate its incremental recognition of the user's utterance. For example, in a traditional decoder module, a language model will interpret the start of each utterance as being independent from the preceding utterance (if any). In other words, the preceding utterance (if any) will not constrain the interpretation of the subsequent utterance. In the present case, by contrast, the dictation module 100 interprets a complete utterance in incremental portions. Further, the start of each incremental portion is constrained by the preceding portion (if any). For example, assume that the user speaks the complete utterance, "I am driving to the store, if I can find it on the map." Further suppose that the dictation module 100 interprets the utterance in four chunks, corresponding to: "I am driving"; "to the store"; "if I can find it"; "on the map." The decoder module 106 will interpret "to the store" with reference to the preceding chunk "I am driving," and so on. The decoder module 106 performs this task by taking into account linguistic-related cost information provided by the language model 110 at all junctures, including at the start of each incremental portion.

Further, the decoder module 106 can leverage the fact that the user is dynamically confirming the correctness of rendered text as it is output for inspection. For example, assume that the decoder module 106 initially interprets the intended phrase "to the store" as "tuna store." Further assume that the user expressly corrects this phrase, e.g., by changing "tuna" to "to the." The dictation module 100 can now consider the phrase "to the store" as the correct interpretation of the user's speech. The dictation module 100 can apply this conclusion in different ways. For example, the dictation module 100 can boost the relevance of the output of the language model 110 when it predicts the word or words which will follow the phrase "to the store." Alternatively presume that the user declines to modify an instance of rendered text. In this case, the dictation module 100 can decline to boost the relevance of the language model's output, or at least delay boosting its relevance until it becomes apparent that the user has implicitly confirmed the correctness of the rendered text by not correcting it. The amount(s) by which the dictation module 100 performs the above-described relevance weighting can be determined in each implementation-specific environment on an empirical basis.

Figure 2:
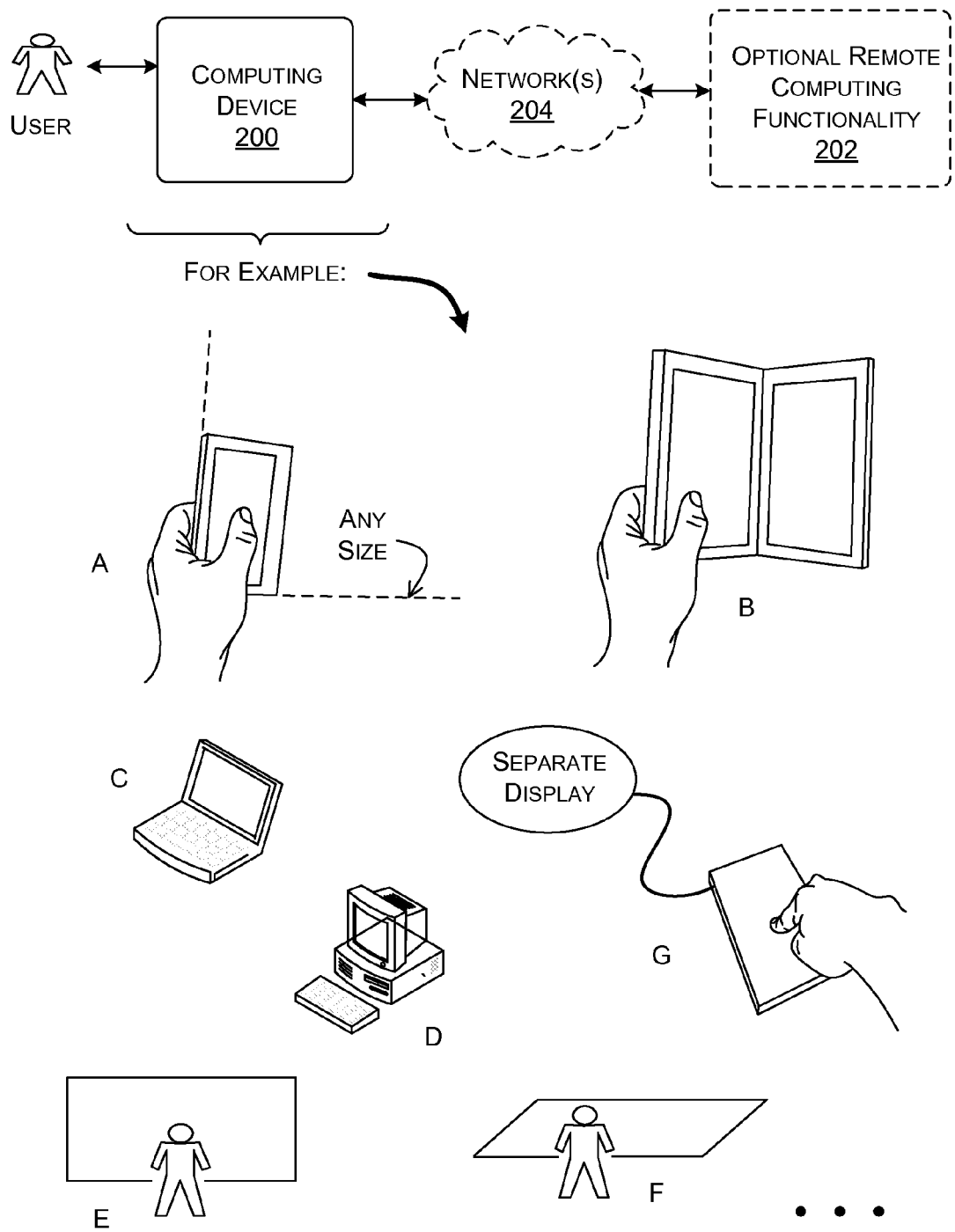
FIG. 2 shows various implementations of the dictation module of FIG. 1.

Advancing to FIG. 2, this figure summarizes different possible implementations of the dictation module 100 of FIG. 1. In one case, a stand-alone computing device 200 of any type can be used to implement all features the dictation module 100. For example, the computing device 200 can implement the features of the dictation module 100 as software, firmware, hardware, etc., or any combination thereof.

In another implementation, one or more features of the dictation module 100 can be implemented by remote computing functionality 202. The remote computing functionality 202 may represent one or more remote server computers and associated data stores. The computing device 200 may interact with the remote computing functionality 202 using any type of network 204, such as a local area network, a wide area network, or any combination thereof.

In either case, the computing device 200 can be implemented as a mobile telephone, personal digital assistant (PDA) device, tablet computing device, etc. of any size. Example A represents this set of implementation options. Alternatively, the computing device 200 can be implemented as a booklet computing device of any size (as represented by example B), a laptop computing device (as represented by example C), a personal computing device or workstation device (as represented by example D), a computing device which projects its output presentation on a wall or tabletop (as represented by examples E and F, respectively), and so on.

In some of the examples shown in FIG. 2 (such as examples A and B), the interaction device 124 (introduced in FIG. 1) corresponds to a touchscreen device of the computing device 200. The user can interact with the touchscreen device by touching it with at least one finger (and/or other hand part(s) and/or a pen device, etc.). But the display device of the computing device 200 need not be co-extensive with the touch-sensitive surface. For example, in the case of example G, a user can interact with a digitizing pad or the like with at least one finger (and/or other hand part(s) and/or a pen device). The digitizing pad is not itself a display surface, but is coupled to a separate display device. In addition or alternatively, the user can interact with the computing device 200 shown in FIG. 1 using a physical keyboard, a mouse device, a joystick, video-detected gesture recognition functionality, gaze recognition functionality, etc., or any combination thereof.

Figure 3:
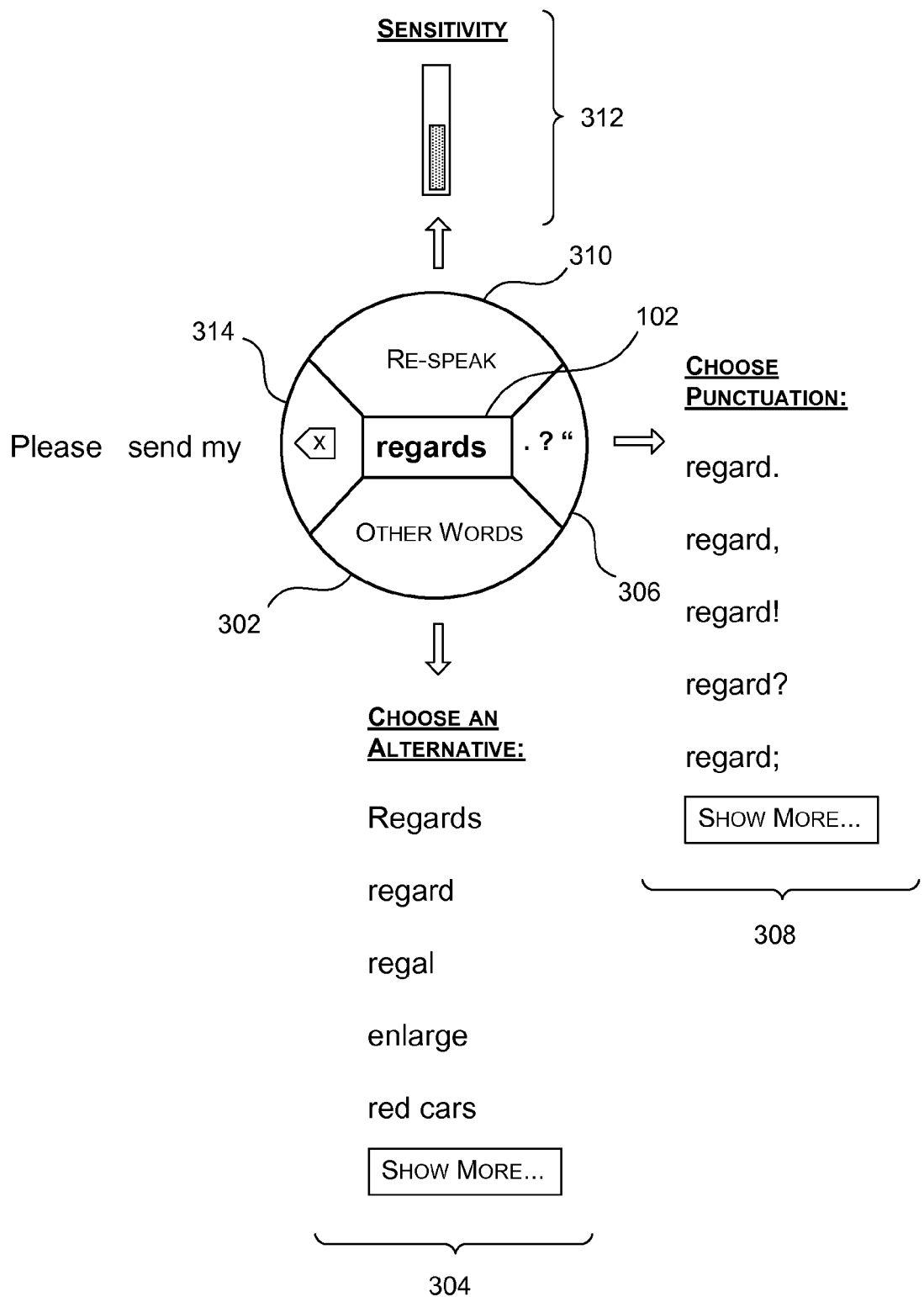
FIG. 3 shows one implementation of a marking menu, provided by the dictation module of FIG. 1.

FIG. 3 shows one example of a menu that is provided by the menu option functionality 128 of FIG. 1. More specifically, presume that the text presentation functionality 120 has presented the words "Please send my regards," corresponding to a part of a complete utterance that the user has spoken so far. Further presume that the user has selected the last-recognized word "regards," e.g., by touching this word with a finger or pen device. In the terminology used here, the word "regards" corresponds to the selected part of the rendered text. In response, the menu option functionality 128 provides a menu having a plurality of menu options. The options correspond to different techniques that can be used to change the word "regards" and/or other parts of the rendered text.

In the particular example of FIG. 3, the menu corresponds to a radial marking menu, also referred to as a pie menu. The options of this menu are radially arrayed around the word in question, namely, the word "regards." The radial marking menu may also include labels that summarize the actions that can be invoked by the respective options. The radial marking menu may also include arrows or the like (not shown) which describe the gestures that can be used to invoke the respective options (to be described below).

Alternatively, or in addition, the menu option functionality 128 can present the options using another type of menu format, such as a pull-down menu, a permanent bar menu, a free-floating or fixed-position pop-up menu, and so on (or any combination thereof).

The marking menu of FIG. 3 includes four representative options for acting on the word "regards." In response to activating a first option 302, the menu option functionality 128 may display a list 304 of alternative words. These alternative words correspond to other interpretations of the word that the user has vocalized. For example, some of these alternative words may correspond to members of the set of n best interpretations identified by the decoder module 106, besides the word "regards." If the user selects one of these alternative words, the menu option functionality 128 can replace the word "regards" with the selected alternative word.

In response to activating a second option 306, the menu option functionality 128 may display a list 308 of punctuation marks that can be added to word "regards," or to another part of the rendered text. For example, the user can select a period (".") entry in this list 308 to add a period to the end of "regards." Alternatively, or in addition, the user may add a punctuation mark to rendered text by vocalizing an instruction to that effect, e.g., by speaking the word "period" after the word "regards." Nevertheless, using the list 308 to add the punctuation mark has certain advantages over providing voice commands. For instance, the use of the list 308 allows the user to speak in a natural and free-flowing manner. Further, the use of the list 308 simplifies the operation of the decoder module 106 because the decoder module 106 is freed from the responsibility of interpreting two different senses of punctuation-related words; for example, the decoder module 106 need not attempt to discriminate between those instances in which the user is using the word "period" as an ordinary word in the sentence, and instances in which the user is using the word "period" to convey an instruction to add punctuation to the text.

The user may select a third option 310 to inform the dictation module 100 that he or she intends to re-speak the word "regards." The dictation module 100 will thereafter interpret the subsequent recognized speech as a replacement for the word "regards," not a new word to be added after the word "regards."

Further, in response to invoking this option 310, the menu option functionality 128 can optionally display any user interface feature that allows the user to view and/or modify any operational parameter of the microphone device 102 and/or any other setting of the dictation module 100. For example, the menu option functionality 128 can invoke a mechanism 312 which displays a current sensitivity level of the microphone device 102. In other words, this mechanism 312 provides a measure that indicates how well the dictation module 100 has detected the user's speech utterance. In response to this measure, the user may choose to increase or decrease the volume of his or her speech to improve the performance of speech recognition.

The user may select a fourth option 314 delete the word in question, i.e., "regards."

The menu options described above are set forth by way of example, not limitation. Other implementations can introduce additional options and/or remove one or more options described above. For example, FIG. 4 shows a radial marking menu having more options compared to the marking menu shown in FIG. 3. That is, in addition to the options described above, the user may invoke a formatting option to add formatting to a selected word or phrase. Further, the user may invoke a suffix option to add a suffix to the end of a selected word or phrase.

Further, the user may activate a spelling option to inform the menu option functionality 128 that he or she will subsequently spell out the characters in the word in question, e.g., by vocalizing the letters "r," "e," "g," "a," "r," "d," "s." If this option is selected, the menu option functionality 128 can inform the decoder module 106 to load an appropriate language model for use in in interpreting the user's vocalization of letters. Note that the user can also spell out the characters of a previously-articulated word after activating the "re-speak" menu option 310, described above in connection with FIG. 3.

Finally, the user may invoke a keyboard option. This prompts the menu option functionality 128 to present one or more types of soft keys on the output presentation 122, such as an alphabetical keypad and/or a numeric keypad. The user may then proceed to use the keypad(s) to modify the text of the word in question ("regards"), and/or to add a new word at any position in the rendered text, and/or to make any other changes to the rendered text.

Figure 7:
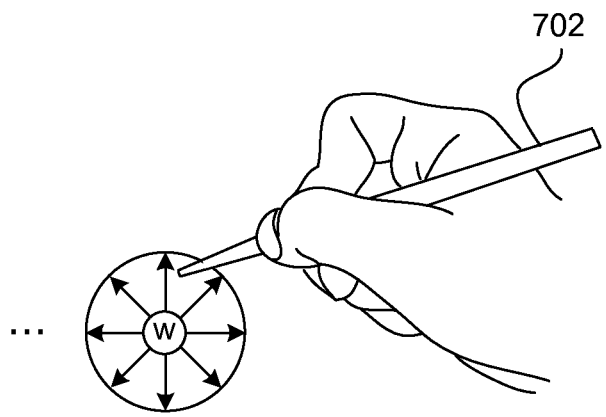

FIGS. 5-7 show three different ways in which the user may interact with a radial marking menu. The symbol "W" that appears at the center of each marking menu represents the word that the user is seeking to modify, e.g., the word "regards" in the examples of FIGS. 3 and 4. In the first case of FIG. 5, the menu option functionality 128 provides a visual representation of the marking menu, e.g., by displaying a pie-type user interface feature, with or without labels designating the different menu options. In one case, a user can select an option in this type of menu by swiping a finger in a direction associated with the option. For example, the user may swipe his or her finger in the direction of arrow 502 to invoke a particular option associated with this direction. The marking menu may optionally provide a visual representation of the arrow 502 to assist the user in interacting with the menu.

In the second case of FIG. 6, the menu option functionality 128 enables the marking menu without providing a visual representation of the menu. A user can invoke an option of this menu in the same manner described above, e.g., by swiping his or her finger in a particular direction to invoke a corresponding option. The user can opt to select an option in this manner to simplify the input operation and to reduce menu-related "clutter" on the output presentation 122. This presumes, however, that the user has memorized the gestures associated with different options. The user may invoke the visual representation of the marking menu (shown in FIG. 5) if he or she forgets (or never learned) the correlation between different gestures and menu options.

FIG. 7 shows a case that is similar to the scenario illustrated in FIG. 5. But here, instead of making the gesture with a finger, the user makes the gesture with a pen device 702 of any type (e.g., either a passive or active pen device). The user can also perform the same pen-based gesture for the scenario of FIG. 6, that is, without the assistance of a visual representation of the marking menu. More generally stated, the user can perform a marking menu gesture using any input functionality or combination of input functionalities that were previously identified in this description.

Figure 8:
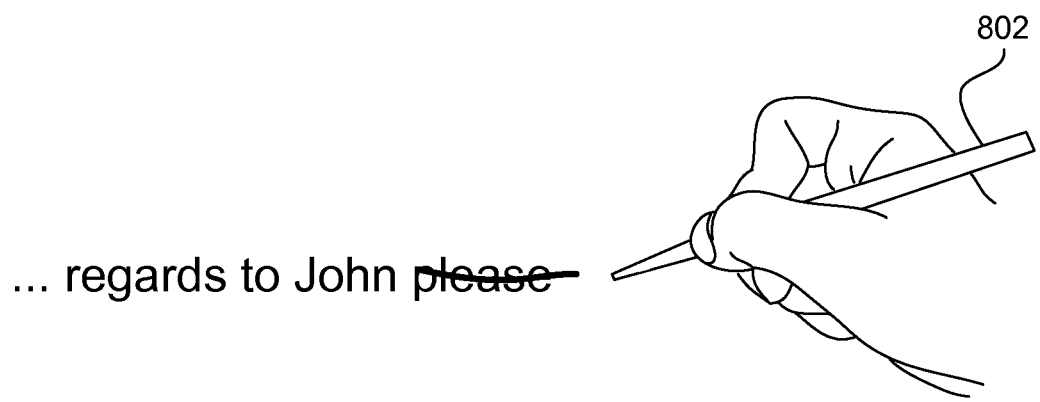
FIG. 8 shows a manner in which a user may modify rendered text, produced by the dictation module of FIG. 1, using a pen-type device.

In the case of FIG. 8, the user can use a pen device 802 (and/or a finger or the like) to modify rendered text. For example, in the example of FIG. 8, the user has used the pen device 802 to cross out the word "please" in the rendered text. This has the effect of deleting the word "please." The user can also add new content to rendered text, such as by adding a punctuation mark to the end of the rendered text using the pen device 802. The user may opt to use this strategy for modifying text instead of the marking menu shown in FIGS. 5-7, or in addition to such a marking menu.

Figure 9:
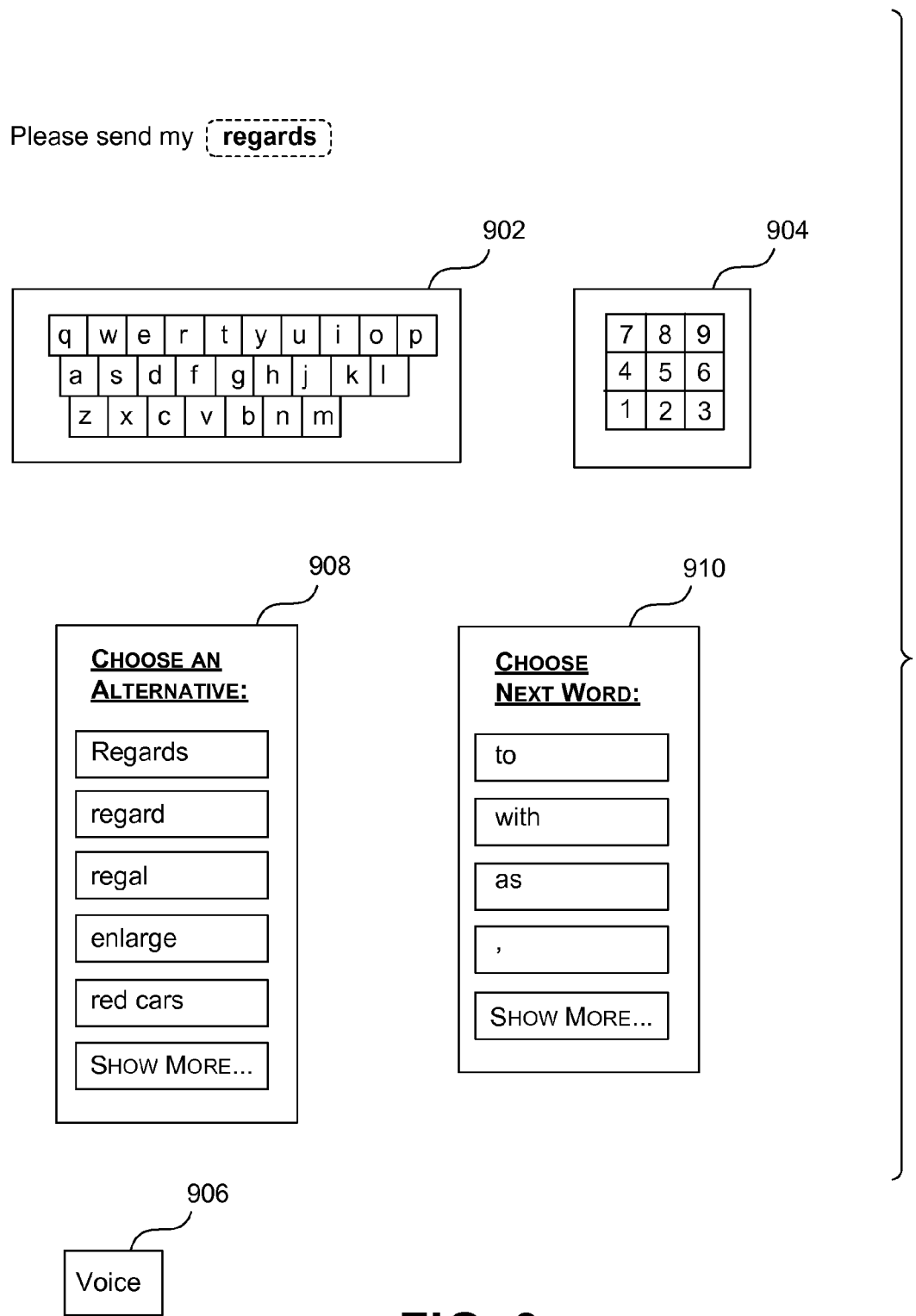
FIG. 9 shows additional types of user interface features that the dictation module (of FIG. 1) can provide to the user.

FIG. 9 illustrates other input mechanisms that the menu option functionality 128 can provide for the purpose of receiving input from the user. For example, the menu option functionality 128 can display one or more sets of soft keys, such as an alphanumeric keypad 902 and/or a numeric keypad 904. The user may use these keypads (902, 904) to manually enter text. The menu option functionality 128 can also include a voice activation button 906 or the like. The user may interact with the voice activation button 906 to activate the voice recognition mode of the dictation module 100. Upon activation, the dictation module 100 can recognize the spoken words of the user and render them onto the output presentation 122, e.g., by adding the voice-recognized text to the text the user has input via the keypads (902, 904). Further, when the voice recognition mode is activated, the dictation module 100 can enable any type of explicit and/or implicit marking menu described above (although not shown in FIG. 9).

In an alternative implementation, the dictation module 100 can activate, as a default, the voice recognition mode. Thereafter, the user can activate one or more of the keypads (902, 904) via an appropriate menu option in the marking menu, e.g., using the "Invoke Keyboard" option shown in FIG. 4. More generally, the user can toggle back and forth between the manual keyboard input mode and the voice recognition mode in any manner throughout a dictation session.

The voice activation button 906 and "Invoke Keyboard" option represent merely one way to activate the voice recognition mode and manual keyboard input mode, respectively. Alternatively, or in addition, the user can activate either the voice recognition mode or the keypads (902, 904) by performing an appropriate gesture. For example, the dictation module 100 can detect when the user touches a touchscreen surface using a particular multi-touch gesture, and, in response, activate the keypads (902, 904).

FIG. 9 also shows a list 908 that presents alternative words. A user can select one of these words to replace a selected part of the rendered text (e.g., the word "regards" in the example of FIG. 9). In addition, FIG. 9 shows a list 910 that presents predicted next words. The dictation module 100 can generate these words based on the output of the language model 110. A user can select one of these words to add to the end of the current rendered text, e.g., by selecting the word "with" to follow "regards."

The menu option functionality 128 may present the lists (908, 910) as floating pop-up menus that are placed in proximity to the selected word, "regards." This type of menu can be presented instead of the above-described radial marking menu, or in addition to the radial marking menu. The menu option functionality 128 can present still other types of menus, as set forth above. The more general point being made here is that the menu option functionality 128 need not bind all or any of the menu options to the rendered text in the manner shown in FIGS. 3 and 4.

FIG. 9 also provides a vehicle for describing different ways in which the adaptation module 132 can modify the operation of the user interaction module 118. To begin with, recall that the user implicitly produces labeled training data by virtue of the decisions that the user makes with respect to the rendered text presented on the output presentation 122. The adaptation module 132 then uses the training data to update the language model 110. In an n-gram language model, the updated language model provides, for each candidate word, an updated probability that the candidate word will be chosen by the user at a particular time, given one or more preceding words that have already been chosen by the user. The adaptation module 132 can also use the updated language model 110 to modify the operation of the user interaction module 118 in various ways.

For example, the adaptation module 132 can use the updated language model 110 to modify any aspect of any user interface feature provided on the output presentation 122. For example, the adaptation module 132 can use the updated language model 110 to vary the order of words in the lists that it produces, such as the lists (908, 910). This ordering reflects the updated probabilities assigned to candidate words. In addition, or alternatively, the adaptation module 132 can use the updated language model 110 to vary any visual and/or behavioral feature of the keypads (902, 904). For example, the adaptation module 132 can use the updated language model 110 to vary the size and/or transparency level and/or color and/or position, etc. of any soft key. These types of changes can be used, for instance, to more effectively promote a soft key that the user is likely to activate next, relative to less probable soft keys. These examples of modification are presented by way of illustration, not limitation; other implementations can modify the operation of the user interaction module 118 in other ways based on the changes made to the language model 110.

B. Illustrative Processes

Figure 10:
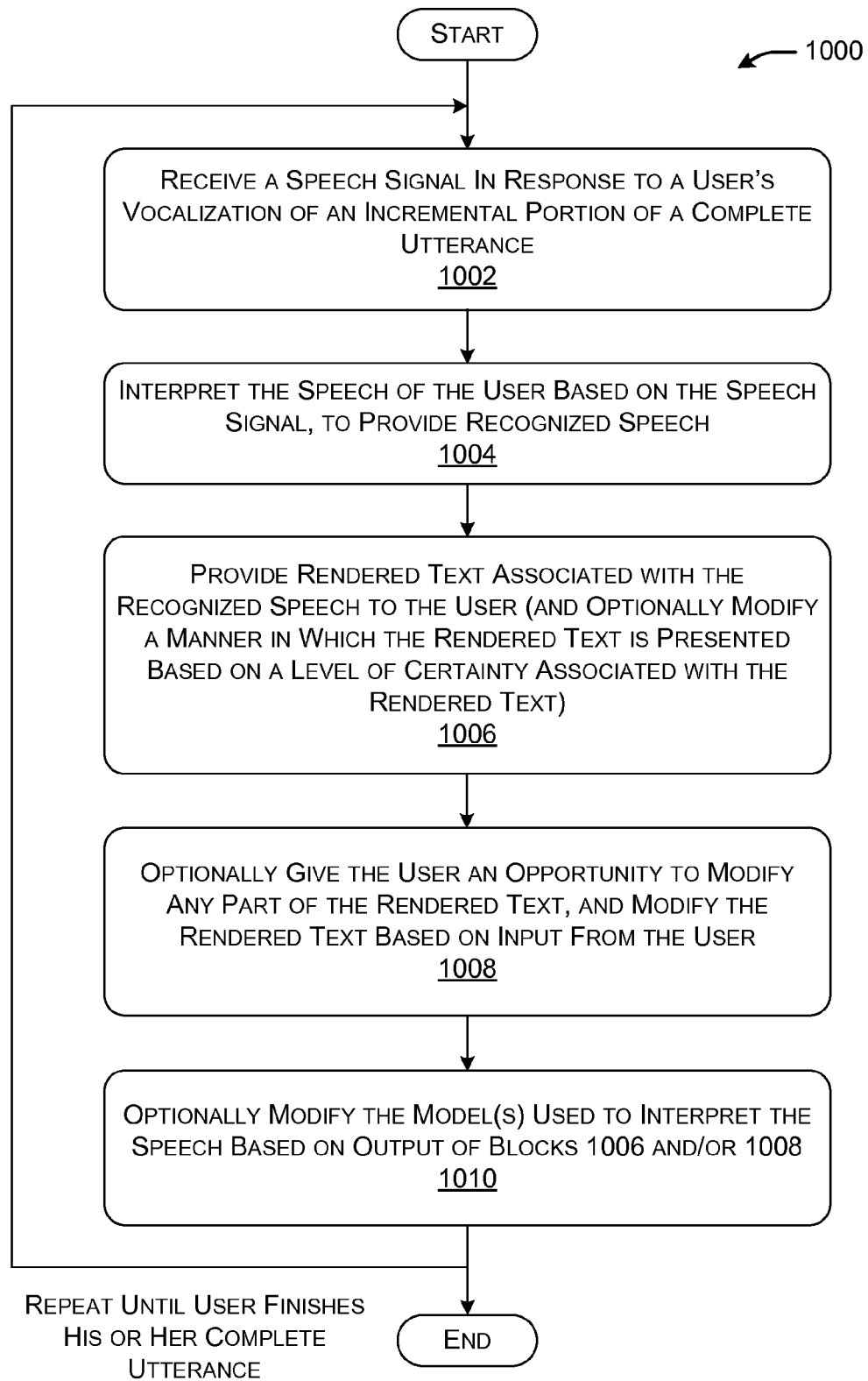
FIG. 10 is a flowchart that represents an overview of one manner of operation of the dictation module of FIG. 1.
Figure 11:
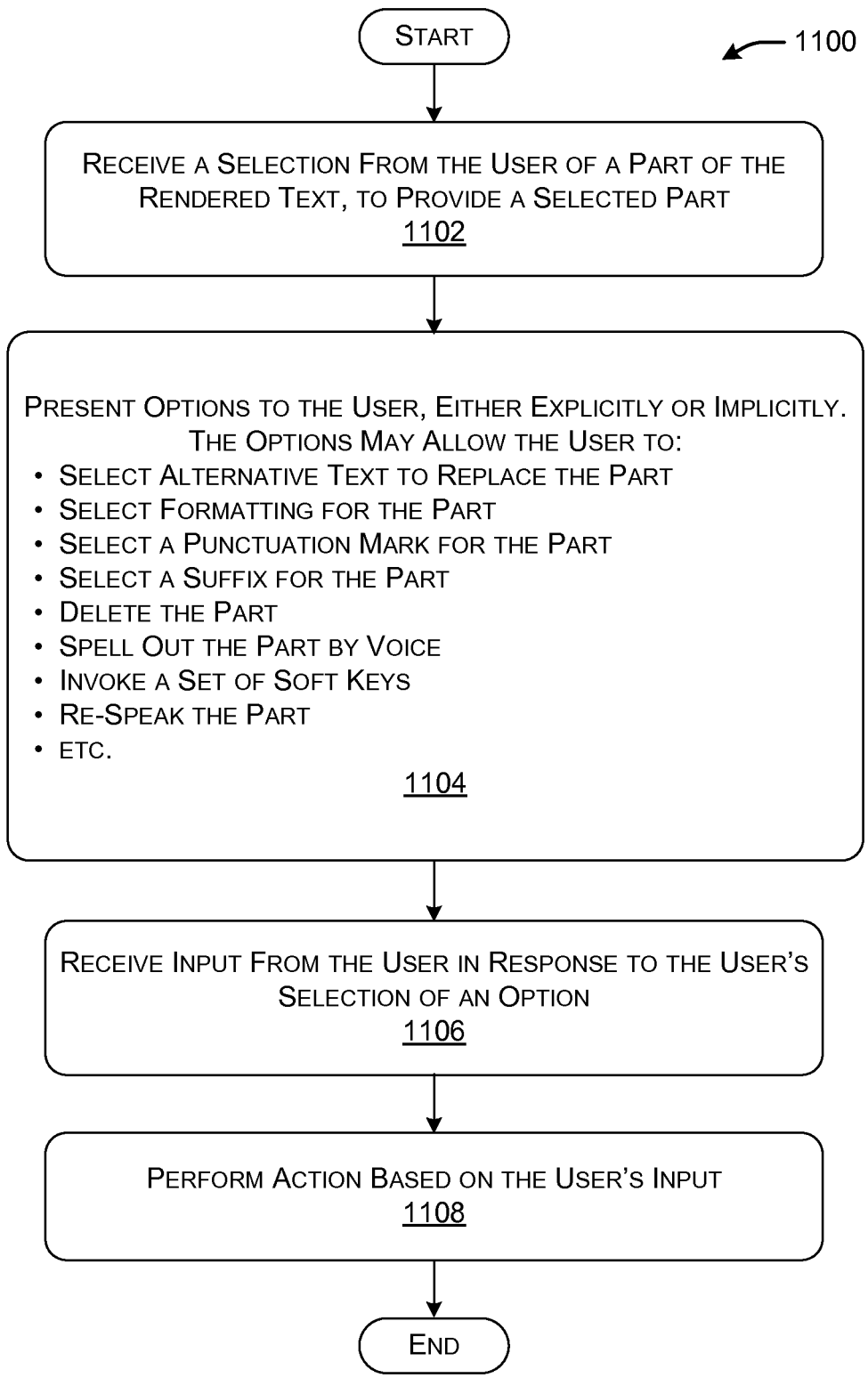
FIG. 11 is a flowchart that represents one manner of presenting a menu to the user, and receiving input from the user in response to the user's interaction with the menu.

FIGS. 10-11 show procedures that explain one manner of operation of the dictation module 100 of FIG. 1. Since the principles underlying the operation of the dictation module 100 have already been described in Section A, certain operations will be addressed in summary fashion in this section.

Starting with FIG. 10, this figure shows a procedure 1000 which represents an overview of one manner of operation of the dictation module 100. In block 1002, the dictation module 100 receives a speech signal in response to the user's vocalization of an incremental portion of a complete utterance.

In block 1004, the dictation module 100 interprets the speech of the user based on features extracted from the speech signal. The dictation module 100 can perform this operation by finding an optimal path through the linguistic lattice 112. The optimal path yields recognized speech associated with the incremental portion.

In block 1006, the dictation module 100 provides rendered text associated with the recognized speech produced in block 1004. Optionally, the dictation module 100 can also convey the level of uncertainty in the rendered text.

In block 1008, the dictation module 100 optionally gives the user the opportunity to modify any part of the rendered text. If the user selects such an option, the dictation module 100 modifies the rendered text in a manner specified by the user.

In block 1010, the dictation module 100 optionally modifies the acoustic model 108 and/or the language model 110 used to produce the recognized speech. The dictation module 100 can perform this task based on the output of blocks 1006 and/or 1008. Namely, the text that is rendered on the output presentation 122 serves as de facto labeled training data for used in updating the model(s).

The dictation module 100 repeats the procedure 1000 of FIG. 10 any number of times until the user finishes his or her complete utterance. In this procedure 1000, the interpretation, presentation, and modification of text occur in incremental fashion, without requiring the user to insert long artificial pauses in the complete utterance. The user may find this method of input preferable to traditional techniques because the dictation module 100 allows a user to maintain focus on a current juncture in a dictation session. This is contrast to those techniques that interpret and output a complete utterance only after the user has finished the complete utterance.

Considered as a whole, the dictation module 100 exhibits a markedly different manner of operation than traditional speech recognition functionality. In the present case, the user speaks while observing the rendered text provided to the output presentation 120. The rendered text provides real-time feedback to the user regarding the success of the dictation module 100 in interpreting the user's speech. For example, suppose that the dictation module 100 is having "difficulty" in interpreting the user's speech. The dictation module 100 can convey this difficulty by slowing the rate at which it delivers the rendered text. (Recall that the rate at which the dictation module 100 delivers text is responsive to the assessed uncertainty of the recognized speech.) Alternatively, or in addition, the dictation module 100 may convey its difficulty by outputting incorrect text that necessitates correction by the user. In either case, the user can respond to the dictation's module performance by altering the manner in which he or she speaks. For example, the user may choose to change any of: the rate at which he or she speaks; the manner in which he or she temporally groups words within an utterance into phrasal chunks; the volume at which he or she speaks, and so on. In this manner, the dictation module 100 thus allows a user to engage its services in a cooperative manner to achieve desired performance.

As a point of clarification, the user may change the manner in which he or she temporally speaks an utterance in any of the ways described above. At the same time, the user can generally maintain the natural flow of the utterance. In other words, the user is not required to insert long artificial pauses in the speech so as to formally inform the dictation module 100 that he or she has finished each incremental portion of speech.

FIG. 11 is a procedure 1100 that represents one way of implementing block 1008 of FIG. 10. In block 1102, the dictation module 100 receives a selection from the user which identifies a part of the rendered text which the user wishes to modify. For example, the user may touch the selected part via a touch-sensitive device, e.g., using a finger, a pen device, etc.

In block 1104, the dictation module 100 presents options to the user, either explicitly (by showing a visual representation of the options) or implicitly (by not showing the visual representation). That is, in one case, the dictation module 100 will display a visual representation of the menu options if the user expressly activates a marking menu; alternatively, the dictation module 100 will detect and respond to a user's gesture (without displaying the visual representation) if the user directly performs the gesture without activating the marking menu. The options can include (but are not limited to): an option to select alternative text to replace the selected part; an option to select formatting for the selected part; an option to select a punctuation mark for the selected part; an option to select a suffix for the selected part; an option to delete the selected part; an option to spell out the selected part by voice; an option to invoke one or more sets of soft keys that enable the user to type out text; an option to re-speak the selected part (e.g., by articulating the word as a whole or spelling it out), and so on.

In block 1106, the dictation module 100 receives input from the user associated with a selected option. In block 1108, the dictation module 100 performs an action based on the selected option, for example, by modifying the selected part in the desired manner.

C. Representative Computing Functionality

FIG. 12 sets forth illustrative computing functionality 1200 that can be used to implement any aspect of the functions described above. For example, the computing functionality 1200 can be used to implement any aspect of the dictation module 100 of FIG. 1, e.g., using any option illustrated in FIG. 2. In all cases, the computing functionality 1200 represents one or more physical and tangible processing mechanisms.

The computing functionality 1200 can include volatile and non-volatile memory, such as RAM 1202 and ROM 1204, as well as one or more processing devices 1206 (e.g., one or more CPUs, and/or one or more GPUs, etc.). The computing functionality 1200 also optionally includes various media devices 1208, such as a hard disk module, an optical disk module, and so forth. The computing functionality 1200 can perform various operations identified above when the processing device(s) 1206 executes instructions that are maintained by memory (e.g., RAM 1202, ROM 1204, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. In all cases, the computer readable medium 1210 represents some form of physical and tangible entity.

The computing functionality 1200 also includes an input/output module 1212 for receiving various inputs (via input modules 1214), and for providing various outputs (via output modules). One particular output mechanism may include a presentation module 1216 and an associated graphical user interface (GUI) 1218. The computing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, the computing functionality can be implemented using any of Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of any user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a computing system, for providing a dictating service, comprising:
  receiving a speech signal in response to vocalization, by a user, of an incremental portion of a complete utterance, the speech signal being from a microphone;
  interpreting the incremental portion based on the speech signal, to provide recognized speech, prior to the user finishing the complete utterance; and
  providing rendered text associated with the recognized speech on an output presentation displayed on a display screen prior to the user finishing the complete utterance, wherein providing the rendered text on the output presentation further comprises modifying a rate at which the rendered text is presented on the output presentation, the rate being modified based on a level of uncertainty associated with each part of the rendered text.

2. The method of claim 1, wherein one or more incremental portions of the complete utterance correspond to respective words of the complete utterance.

3. The method of claim 1, wherein one or more incremental portions of the complete utterance correspond to respective phrases of the complete utterance.

4. The method of claim 1,
  wherein said interpreting comprises performing a search over a plurality of possible paths in a linguistic lattice, to find a most likely path, each path comprising a different interpretation of the incremental portion, wherein the search is commenced in response to detection of a pause in the vocalization of the complete utterance, the pause having a duration expressed by a silence threshold, and wherein the silence threshold is set to approximately zero.

5. The method of claim 1, wherein said interpreting comprises treating each incremental portion as linguistically dependent on a preceding incremental portion, when a preceding incremental portion exists.

6. The method of claim 1, wherein said interpreting comprises boosting a relevance of an output of a language model after a user chooses to modify an incremental portion.

7. The method of claim 1, wherein said providing the rendered text comprises providing the rendered text in a character-by-character serial manner with a delay between characters to simulate operation of a manual typewriter, each character forming a part of a representation of the complete utterance.

8. The method of claim 1, wherein said providing the rendered text comprises providing sound that simulates operation of a manual typewriter.

9. The method of claim 1, wherein said interpreting is performed using an acoustic model and a language model, wherein the method further comprises modifying at least one of the acoustic model and the language model based on the rendered text, the rendered text being confirmed by the user as being a correct representation of the incremental portion by virtue of a decision by the user to either modify, or not to modify, the rendered text.

10. The method of claim 1, further comprising providing at least one option to modify a selected part of the rendered text, the selected part of the rendered text being modifiable based on received input.

11. The method of claim 10, wherein said providing the at least one option to modify the selected part of the rendered text comprises:

receiving a selection of a part of the rendered text, to provide the selected part; and providing a menu that includes a plurality of options regarding different respective ways in which the selected part is modifiable.

12. The method of claim 11, wherein the menu corresponds to a marking menu, the marking menu either: explicitly displaying the menu options; or implicitly enabling the menu options without explicitly displaying the menu options.

13. The method of claim 11, wherein the plurality of options include at least one of:

an option to choose an alternative word or phrase to replace the selected part;

an option to add a punctuation mark to the selected part;

an option to add formatting to the selected part;

an option to delete the selected part;

an option to spell out the selected part by voice;

an option to invoke a soft keyboard; and an option to re-speak the selected part.

14. The method of claim 1, further comprising presenting a set of soft keys for use by the user in manually inputting text; and modifying at least one aspect of the set of soft keys based on the rendered text.

15. The method of claim 1, wherein providing the rendered text on the output presentation further comprises presenting a symbol in proximity of a part of the rendered text responsive to the part of the rendered text being assessed to be uncertain, wherein the part of the rendered text is assessed to be uncertain based on the level of uncertainty associated with each part of the rendered text.

16. The method of claim 1, wherein providing the rendered text on the output presentation further comprises modifying at least one of a color, a size, a font, or a transparency level at which the rendered text is presented on the output presentation based on the level of uncertainty associated with each part of the rendered text.

17. A computing system, comprising:

at least one processing device; and memory that comprises computer readable instructions that, when executed by the at least one processing device, cause the at least one processing device to perform acts including:

extracting features from a speech signal, the speech signal being received in response to vocalization, by a user, of an incremental portion of a complete utterance, the speech signal being from a microphone;

interpreting the incremental portion based on the features extracted from the speech signal, prior to the user finishing the complete utterance, to provide recognized speech, the speech signal being acoustically interpreted using an acoustic model and linguistically interpreted using a language model; and providing rendered text associated with the recognized speech on an output presentation displayed on a display screen prior to the user finishing the complete utterance, wherein providing the rendered text on the output presentation further comprises modifying a rate at which the rendered text is presented on the output presentation, the rate being modified based on a level of uncertainty associated with each part of the rendered text.

18. The computing system of claim 17, wherein the memory further comprises computer readable instructions that, when executed by the at least one processing device, cause the at least one processing device to perform acts including:

presenting a plurality of options for modifying a selected part of the rendered text in different respective ways, the plurality of options being presented in a form of a marking menu, the marking menu being placed in proximity to the selected part of the rendered text; and modifying at least one of the acoustic model or the language model based on the rendered text that is either unmodified or modified based on input received responsive to the plurality of options.

19. A computer readable storage device for storing computer readable instructions, the computer readable instructions providing a dictation module when executed by one or more processing devices, the computer readable instructions comprising:

logic configured to present rendered text associated with a vocalization, by a user, of an incremental portion of a complete utterance on a display screen prior to the user finishing the complete utterance, said logic configured to present the rendered text further being configured to modify a rate at which the rendered text is presented, the rate being modified based on a level of uncertainty associated with the rendered text; and logic configured to present a marking menu on the display screen to the user that provides a plurality of options, the plurality of options giving the user an opportunity to modify any part of the rendered text in different respective ways.

20. The computer readable storage device of claim 19, wherein the marking menu is a radial marking menu, and wherein the plurality of options are radially arrayed around the selected part of the rendered text.

\* \* \* \* \*